US009606919B2

(12) United States Patent
Ni et al.

(10) Patent No.: US 9,606,919 B2
(45) Date of Patent: *Mar. 28, 2017

(54) METHOD AND APPARATUS TO FACILITATE SHARED POINTERS IN A HETEROGENEOUS PLATFORM

(71) Applicant: Intel Corporation, Santa Clara, CA (US)

(72) Inventors: Yang Ni, Sunnyvale, CA (US); Rajkishore Barik, Houston, TX (US); Ali-Reza Adl-Tabatabai, San Jose, CA (US); Tatiana Shpeisman, Menlo Park, CA (US); Jayanth N. Rao, Folsom, CA (US); Ben J. Ashbaugh, Folsom, CA (US); Tomasz Janczak, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 49 days.

This patent is subject to a terminal disclaimer.

(21) Appl. No.: 14/513,065

(22) Filed: Oct. 13, 2014

(65) Prior Publication Data

US 2015/0186273 A1 Jul. 2, 2015

Related U.S. Application Data

(63) Continuation of application No. 14/020,616, filed on Sep. 6, 2013, now Pat. No. 8,862,831, which is a
(Continued)

(51) Int. Cl.
*G06F 12/08* (2016.01)
*G06F 12/0806* (2016.01)
(Continued)

(52) U.S. Cl.
CPC ........ *G06F 12/0806* (2013.01); *G06F 15/167* (2013.01); *G06T 1/60* (2013.01)

(58) Field of Classification Search
None
See application file for complete search history.

(56) References Cited

U.S. PATENT DOCUMENTS 6,289,432 B1    9/2001   Ault et al.
6,822,654 B1   11/2004   Trivedi et al.
(Continued)

FOREIGN PATENT DOCUMENTS

WO    WO2010056587 A2    5/2010

OTHER PUBLICATIONS

International Search Report and Written Opinion, mailed May 30, 2012, from PCT Application No. PCT/US2011/064244, 9 pages.
(Continued)

*Primary Examiner* — Yaima Rigol
(74) *Attorney, Agent, or Firm* — Schwabe, Williamson & Wyatt, P.C.

(57) ABSTRACT

A method and apparatus to facilitate shared pointers in a heterogeneous platform. In one embodiment of the invention, the heterogeneous or non-homogeneous platform includes, but is not limited to, a central processing core or unit, a graphics processing core or unit, a digital signal processor, an interface module, and any other form of processing cores. The heterogeneous platform has logic to facilitate sharing of pointers to a location of a memory shared by the CPU and the GPU. By sharing pointers in the heterogeneous platform, the data or information sharing between different cores in the heterogeneous platform can be simplified.

17 Claims, 6 Drawing Sheets

Related U.S. Application Data continuation of application No. 13/074,779, filed on Mar. 29, 2011, now Pat. No. 8,566,537.

(51) Int. Cl.
*G06F 15/167* (2006.01)
*G06T 1/60* (2006.01)

(56) References Cited

U.S. PATENT DOCUMENTS

| | | |
|---|---|---|
| 7,096,252 B1 | 8/2006 | Hvostov et al. |
| 7,787,629 B1 | 8/2010 | Belenko |
| 8,397,241 B2 * | 3/2013 | Xiaocheng ............... G06F 9/544 |
| | | 345/520 |
| 2003/0140085 A1 | 7/2003 | Moir et al. |
| 2004/0064654 A1 | 4/2004 | Willis et al. |
| 2004/0163046 A1 | 8/2004 | Chu et al. |
| 2007/0283103 A1 | 12/2007 | Hofstee et al. |
| 2008/0109795 A1 | 5/2008 | Buck et al. |
| 2010/0106948 A1 | 4/2010 | Bellows et al. |
| 2010/0118041 A1 * | 5/2010 | Chen ....................... G06F 9/544 |
| | | 345/542 |
| 2010/0251265 A1 | 9/2010 | Hodson et al. |
| 2011/0161620 A1 | 6/2011 | Kaminski et al. |

OTHER PUBLICATIONS

The Notice of Preliminary Rejection, mailed Nov. 13, 2012 for Korean Patent Application No. 2012-7022911, 6 pages.

Office Action mailed Jun. 20, 2013 for Chinese Application No. 201180016783.7; 12 pages.

Notification Concerning Transmittal of International Preliminary Report on Patentability mailed Oct. 10, 2013 for International Application No. PCT/US2011/064244, 7 pages.

Office Action mailed Jan. 22, 2014 for Chinese Application No. 201180016783.7, 10 pages.

* cited by examiner

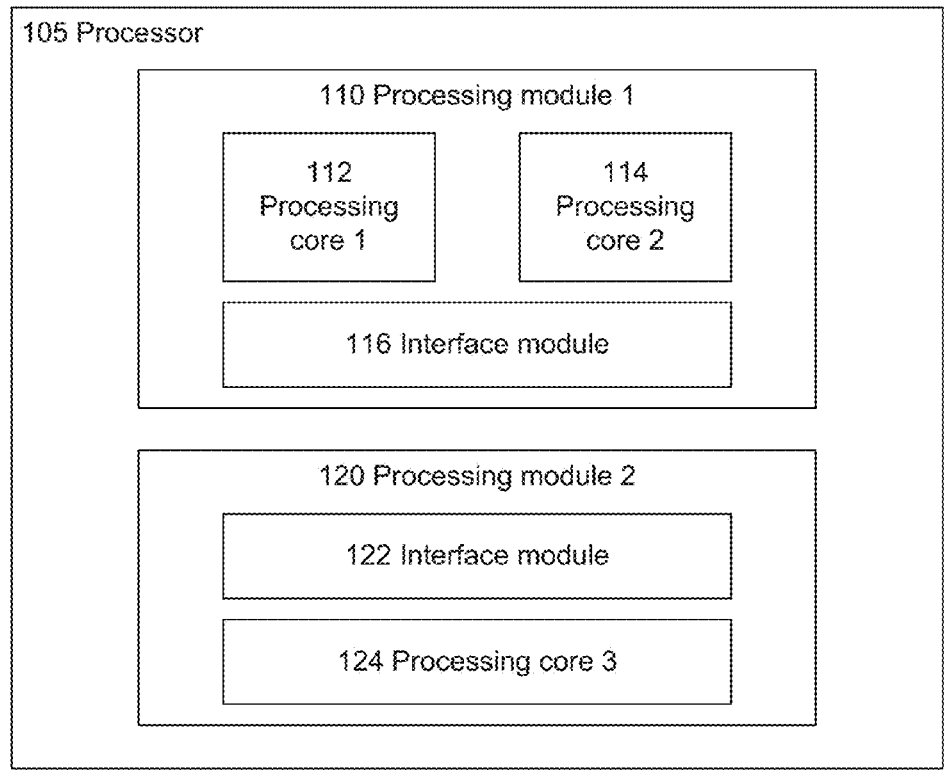

FIG. 1

```
202:  typedef struct context_s {          // allocated in shared virtual memory
          int *p;
      } context_t;

203:  void (fun)(void *, size_t);
      ...
      int count = ...;
      context_t context = (context_t *) malloc (sizeof(context_t));   // allocated in
                                                                      // shared virtual
                                                                      // memory
      context->p = malloc (sizeof(int) * count);  // allocated in shared virtual memory 204:  offload (count,                     // number of iterations
               context,                   // context of type void *
               &fun                       // pointer to offload function
              );
```

FIG. 2

```
410:  DCL_UAVRAW u0, TRUE = {
              KERNEL_ARGUMENT,0
      };

412:  DCL_CONSTANTREGISTER c0 = {
              KERNEL_ARGUMENT,1,0      // Base address of shared region
              KERNEL_ARGUMENT,2,0      // Integer value of ptr. p
              UNUSED,0,0,
              UNUSED,0,0
      };

414:  DCL_INPUT i0.xyz, THREAD_ID;

416:  DCL_POINTER ptr0;
418:  DCL_POINTER ptr1;
420:  DCL_POINTER ptr2;

422:  ADDRESS_OF ptr0, u0;
424:  PADD ptr1, ptr0, -c0.x          // GPU pointer for CPU virtual addr. 0
426:  PADD ptr2, ptr1, c0.y           // Pointer p
```

FIG. 4

```
510:  typedef struct linked_list_node_s{
              int key;
              struct linked_list_node_s *next;
      } linked_list_node;

520:  typedef struct node_context {
              linked_list_node *node;
      } node_context_t;

530:  void foo(void *myctx, size_t i) {     // to be executed on the GPU
              node_context_t *ctx = (node_context_t *)myctx;
              linked_list_node *p = ctx->node;
              p[i].next = &p[i+1];
      }

540:  linked_list_node *p;

550:  main() {
              linked_list_node* p = malloc(sizeof(linked_list_node)*count);
              node_context_t *ctx = (node_context_t *) malloc (sizeof(node_context_t));
              ctx->node = p;
              offload(N, (void *) ctx, &foo);
      }
```

FIG. 5

```
610:   MOV r0.x, i0.x;

612:   SHL r1.x, r1.x, 3          // sizeof(linked_list_node) = 8 = 2^3

614:   UADD r0.x, r0.x, 4         // offset of field "next" is 4

616:   PADD ptr3, ptr2, r0.x      // p[i].next

618:   MOV r1.x, i0.x;

620:   UADD r1.x, r1.x, 1

622:   SHL r1.x, 3

624:   PADD ptr4, ptr2, r1.x      // p[i+1]

626:   PDIFF r2.x, ptr4, ptr0     // Calculating &p[i+1]

628:   UADD r3.x, r2.x, c0.x      // Calculating &p[i+1]

630:   STORE_RAW_PTR ptr3, r3.x   // p[i].next = &p[i+1]
```

600                    FIG. 6

```
710:   typedef struct linked_list_node_s{
              int key;
              __global struct linked_list_node_s *next;
       } linked_list_node;

720:   typedef struct node_contex {
              __global linked_list_node *node;
       } node_context_t;

730:   __kernel void foo(__global char *sharedRegion, ptrdiff_t baseAddr, ptrdiff_t ctxAddr)
       {                                       // to be executed on the GPU
              size_t i = get_global_id(0);
              __global char *tmp1 = sharedRegion – baseAddr + ctxAddr;
              __global node_context_t *ctx = (__global node_context_t *)tmp1;
              __global char *tmp2 = sharedRegion – baseAddr + (ctx->node);
              __global linked_list_node *p = (__global linked_list_node *)tmp2;
              __global char *tmp3 = (__global char *)&p[i+1];
              p[i].next = tmp3 – sharedRegion + baseAddr;
       }
```

700                    FIG. 7

METHOD AND APPARATUS TO FACILITATE SHARED POINTERS IN A HETEROGENEOUS PLATFORM

CROSS REFERENCE TO RELATED APPLICATION

The present application is a continuation of and claims priority under 35 U.S.C. §120 to U.S. patent application Ser. No. 14/020,616, entitled "METHOD AND APPARATUS TO FACILITATE SHARED POINTERS IN A HETEROGENEOUS PLATFORM," filed Sep. 6, 2013, which is a continuation of U.S. patent application Ser. No. 13/074,779, entitled "METHOD AND APPARATUS TO FACILITATE SHARED POINTERS IN A HETEROGENEOUS PLATFORM," filed Mar. 29, 2011, now issued as U.S. Pat. No. 8,566,537, both of which are incorporated herein by reference in their entireties.

FIELD OF THE INVENTION

This invention relates to shared pointers, and more specifically but not exclusively, to a method and apparatus to facilitate shared pointers in a heterogeneous platform.

BACKGROUND DESCRIPTION

OpenCL (Open Computing Language) is a framework for writing programs that execute across a heterogeneous platform that has central processing units (CPUs), graphics processing units (GPUs), and other processors. OpenCL consists of a programming language that is based on a subset of C99 standard and a number of extensions that is both used to communicate between various devices and write data-parallel computational kernels for these devices. One of the key limitations of OpenCL is that it does not allow sharing of complex data structures between multiple heterogeneous devices in a seamless manner.

Typically, a GPU's memory is divided into a set of regions or areas. These regions are referenced by a binding table and an offset. In such a design, translating a CPU pointer to a GPU pointer requires decoding the offset and also the binding table because there exists more than one binding table.

BRIEF DESCRIPTION OF THE DRAWINGS

The features and advantages of embodiments of the invention will become apparent from the following detailed description of the subject matter in which:

FIG. 1 illustrates a block diagram of a processor in accordance with one embodiment of the invention;

FIG. 2 illustrates a sample code in accordance with one embodiment of the invention;

FIG. 4 illustrates a sample code in accordance with one embodiment of the invention;

FIG. 5 illustrates a sample code in accordance with one embodiment of the invention;

FIG. 6 illustrates a sample code in accordance with one embodiment of the invention;

FIG. 7 illustrates a sample code in accordance with one embodiment of the invention;

DETAILED DESCRIPTION

Figure 3:
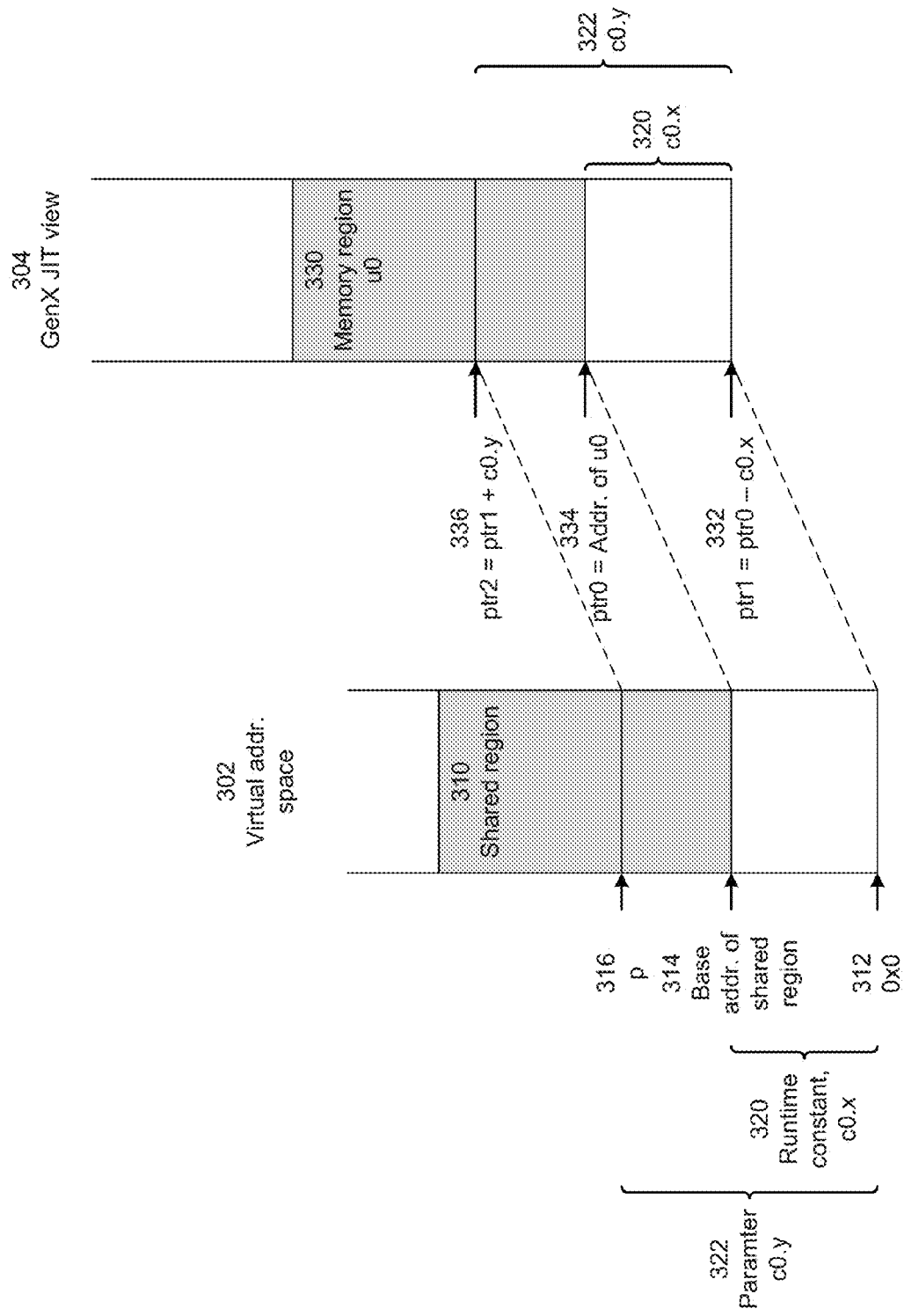
FIG. 3 illustrates a mapping of a shared pointer in accordance with one embodiment of the invention.

Embodiments of the invention described herein are illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference numerals have been repeated among the figures to indicate corresponding or analogous elements. Reference in the specification to "one embodiment" or "an embodiment" of the invention means that a particular feature, structure, or characteristic described in connection with the embodiment is included in at least one embodiment of the invention. Thus, the appearances of the phrase "in one embodiment" in various places throughout the specification are not necessarily all referring to the same embodiment.

Embodiments of the invention provide a method and apparatus to facilitate shared pointers in a heterogeneous platform. In one embodiment of the invention, the heterogeneous or non-homogeneous platform includes, but is not limited to, a central processing core or unit, a graphics processing core or unit, a digital signal processor, an interface module, and any other form of processing cores. In one embodiment of the invention, the heterogeneous platform has at least two different processing cores.

In one embodiment of the invention, a compiler code generation scheme or method allows pointers to be shared between two different cores in the heterogeneous platform. For example, in one embodiment of the invention, the heterogeneous platform comprises a central processing unit (CPU) and a graphics processing unit (GPU). The heterogeneous platform has logic to facilitate sharing of pointers to a location of a memory shared by the CPU and the GPU. In one embodiment of the invention, a new way of programming the CPU and the GPU by extending the C programming language is provided to allow efficient use of both devices. This programming model supports a shared virtual memory (SVM) that provides a single address space between the CPU and the GPU so that pointers can be directly shared by both devices. CPU pointers can be seamlessly shared with GPU devices either in software or hardware in one embodiment of the invention.

By sharing pointers in the heterogeneous platform, the data or information sharing between different cores in the heterogeneous platform can be simplified in one embodiment of the invention. For example, in one embodiment of the invention, when the heterogeneous platform uses pointer-based data structures such as linked lists or trees, the different cores in the heterogeneous platform can use high-level programming languages such as C, C++ or OpenCL to share data using pointers shared among the different cores.

In one embodiment of the invention, the heterogeneous platform does not need to make virtual-to-physical mappings on one processing core be the same as another processing core in order to share the pointers. In one embodiment of the invention, the compiler executing on the heterogeneous platform generates code that adjusts the virtual addresses appropriately so that each core is able to reference the same physical memory location. The generated code includes, but is not limited to, machine code, intermediate representation (IR) code and any other form of code.

FIG. 1 illustrates a block diagram of a processor 105 in accordance with one embodiment of the invention. The processor 105 illustrates one embodiment of a heterogeneous platform and it has a processing module 1 110 and a processing module 2 120. The processing module 1 110 has a processing core 1 112 and a processing core 2 114 in one embodiment of the invention. In one embodiment of the invention, the processing module 1 110 has more than two processing cores. In another embodiment of the invention, the processing module 1 110 has only one processing core.

The processing module 1 110 has an interface module 116 that allows communication with other modules in the processor 105. In one embodiment of the invention, the interface module 116 operates in accordance with, but is not limited to, the Intel® QuickPath Interconnect (QPI) communication protocol or any other communication protocol.

The processing module 2 120 has a processing core 3 124 and an interface module 122 that allows it to communicate with the processing module 1 110. In one embodiment of the invention, the processing module 1 110 is a central processing unit and the processing module 2 120 is a graphics processing unit. The processor 105 may have other types of processing units in another embodiment of the invention.

The illustration of the processor 105 is not meant to be limiting and other configurations of the processor 105 can be used without affecting the workings of the invention. For example, in one embodiment of the invention, the processor 105 has a third processing module that is coupled with the processing modules 1 110 and 2 120.

FIG. 2 illustrates a sample code 200 in accordance with one embodiment of the invention. The sample code 200 illustrates one embodiment of the invention where a pointer is defined in a CPU and passed to a GPU. The GPU receives the pointer and uses the pointer for operations such as, but are not limited to, de-referencing operations, load instructions or operations, store instructions or operations, pointer arithmetic operations and the like. The shared pointer points to the same physical memory location notwithstanding whether the shared pointer is de-referenced on the CPU or GPU.

The sample code 200 illustrates a code written in C language that includes functions for offloading data or task parallel computation to the GPU. The line 202 illustrates a malloc library call that allocates an array in a shared virtual memory or address space. The line 204 illustrates an offload function call that places a data-parallel task into a queue for execution. The first argument specifies the number of iterations to be performed, the second argument specifies the context, and the third argument specifies the function pointer to offload the function.

In one embodiment of the invention, the CPU and the GPU have different representations for a pointer. For example, in one embodiment of the invention, the encoding and the length or in-bits of a pointer may be different on the GPU compared to the CPU. The pointer in a GPU may be represented as a binding table index with an offset in one embodiment of the invention. The binding table has base memory addresses for each of the GPU surface entries and the offset is added to this base address at run time. In one embodiment of the invention, to overcome the different representations for a pointer in the CPU and GPU, the heterogeneous platform has logic to maintain the in-memory representation of pointers in the GPU in a similar manner as the CPU. The value of the virtual address represented by the pointers may have 32, 64, or any other suitable number of bits in one embodiment of the invention.

FIG. 3 illustrates a mapping 300 of a shared pointer in accordance with one embodiment of the invention. For clarity of illustration, the mapping 300 illustrates a shared pointer between a CPU and a GPU in one embodiment of the invention. The virtual address space 302 illustrates the memory view of the CPU and the GenX Just In Time (JIT) view 304 illustrates the memory view of the GPU. The GenX JIT Intermediate Language (IL) is an intermediate representation language for Intel® Graphics Processors in one embodiment of the invention. In one embodiment of the invention, the GenX JIT IL describes the GPU memory model and program instructions.

The virtual address space 302 of the CPU and the GenX JIT view 304 of the GPU are associated with a shared memory region that is accessible by both the CPU and the GPU. For clarity of illustration, the shared region 310 in the virtual address space 302 illustrates a particular virtual memory mapping of a shared memory in one embodiment of the invention. The starting address of the virtual address space 302 is illustrated by the memory address 0×0 312. The shared region 310 has a base address 314 and a pointer p 316 that points or references a particular memory location of the shared region 310.

In one embodiment of the invention, a runtime constant $c0.x$ 320 is determined at runtime and is stored. The runtime constant $c0.x$ 320 represents the base address 314 of the shared region 310. In one embodiment of the invention, a parameter $c0.y$ 322 is loaded from a register or any storage area. The parameter $c0.y$ 322 represents the memory address of the pointer p 316 in the shared region 320. In one embodiment of the invention, the runtime constant $c0.x$ 320 and the parameter $c0.y$ 322 are stored as integers.

In one embodiment of the invention, the runtime constant $c0.x$ 320 is passed to the GPU as a runtime constant. In one embodiment of the invention, the parameter $c0.y$ 322 is pre-loaded from a register. For example, in one embodiment of the invention, the heterogeneous platform has a software driver that passes the runtime constant $c0.x$ 320 to the compiled code running on the GPU and the $c0.y$ 322 is pre-loaded from a register.

In one embodiment of the invention, the GPU have a memory that can be divided into one or more set of regions or areas. The one or more set of regions can be referenced by a binding table and an offset in one embodiment of the invention. The memory region u0 330 illustrates a memory in a GPU that has a single binding table with offsets for the pointers. The GPU uses the runtime constant $c0.x$ 320 and the parameter $c0.y$ 322 to determine the corresponding shared region in the GenX JIT view 304. For example, the point ptr0 334 represents the starting address of the memory region u0 330 in the GPU and it is associated with the base address 314 of the shared region 310 of the CPU.

The pointer ptr1 332 is determined from the pointer ptr0 334 and the runtime constant $c0.x$ 320 in one embodiment of the invention. For example, in one embodiment of the invention, the pointer ptr1 332 is determined by subtracting the runtime constant $c0.x$ 320 from the pointer ptr0 334. In another embodiment of the invention, the pointer ptr1 332 is determined by adding the pointer ptr0 334 to the negative value of the runtime constant $c0.x$ 320.

The GPU representation of the pointer ptr2 336 can be derived from the ptr1 332 and the integer value of ptr2 336 through a pointer addition operation in one embodiment of the invention. For example, in one embodiment, the ptr2 336 is determined by adding the pointer ptr1 332 with the parameter $c0.y$ 322.

In one embodiment of the invention, the runtime constant c0.x 320 and the parameter c0.y 322 allow a mapping of the pointer p 316 to the pointer ptr2 336 without the need of a common virtual-to-physical mapping on both the CPU and the GPU.

FIG. 4 illustrates a sample code 400 in accordance with one embodiment of the invention. For clarity of illustration, FIG. 4 is discussed with reference to FIG. 3. In GenX JIT IL, a pointer is associated with, but not limited to, a resource, a memory region in a GPU, constant buffer, or thread group shared memory. Each of these entities has its own binding table entry. To support shared pointers, a single memory region in the GPU is allocated in the program that makes the binding table index a constant for all pointers based on that memory region in the GPU. This allows the translating of a virtual address into a binding table index and an offset much easier as the binding table index is constant.

In one embodiment of the invention, all pointers of the CPU are passed to the kernel code on the GPU as pointer-sized integers. For example, in one embodiment of the invention, if the native size of the pointer is 32 bits, a 32 bit integer is passed from the CPU to the GPU. In other embodiments of the invention, the native size of the pointer may be 64 bits or any other suitable number of bits.

In one embodiment of the invention, the offsets of each pointer are derived from the integer values and are applied to the single memory region in the GPU. This allows the equivalent GPU pointers in the GenX JIT IL to be obtained for all CPU pointers. The sample code 400 illustrates an example in GenX JIT IL code for the pointers of 32-bits in one embodiment of the invention.

Line 410 illustrates a declaration of a memory region u0 330 in a GPU. In one embodiment of the invention, the software driver patches or associates the memory region u0 330 to the memory region shared by the CPU and GPU. Line 412 illustrates a declaration of the base address 314 of the shared region and the pointer p 316. Line 414 illustrates a declaration of a thread identification (ID). Lines 416, 418, and 420 illustrate the declaration of the pointers ptr0 334, ptr1 332, and ptr2 336 respectively.

Line 422 illustrates that the pointer ptr0 334 is assigned to the memory region u0 330. Line 424 illustrates a declaration of the pointer ptr1 332 with two arguments that includes the pointer ptr0 334 and the runtime constant c0.x 320. The PADD function adds the first argument, i.e., pointer ptr0 334, and the second argument, i.e., negative runtime constant c0.x 320 or −c0.x, to obtain the pointer ptr1 332.

Line 426 illustrates a declaration of the pointer ptr2 336 with two arguments that includes the pointer ptr1 332 and the parameter c0.y 322. The PADD function adds the first argument, i.e., pointer ptr1 332, and the second argument, i.e., parameter c0.y 322, to obtain the pointer ptr2 336.

The sample code 400 illustrates one embodiment of the invention and is not meant to be limiting. The sample code 400 can be optimized by a dynamic compiler in one embodiment of the invention. For example, in one embodiment of the invention, a dynamic compiler knows the run time values of the memory region u0 330 and the runtime constant c0.x 320, the lines 422 and 424 can be removed.

One of ordinary skill in the relevant art will readily appreciate other code formats can be used without affecting the workings of the invention and these other code formats shall not be described. In another embodiment of the invention, 64 bit pointers can also be used without affecting the workings of the invention.

The sharing of the pointers is not limited to a compiler backend in one embodiment of the invention. In another embodiment of the invention, the sharing of the pointers can be performed as compiler transformations at other intermediate language levels. For example, in one embodiment of the invention, the sharing of the pointers can be performed using a source-to-source transformation that generates OpenCL code from C or OpenCL code. In another embodiment of the invention, the sharing of the pointers can be performed at a low level virtual machine IR (LLVMIR) level, i.e., transformation from LLVMIR to LLVMIR.

FIG. 5 illustrates a sample code 500 in accordance with one embodiment of the invention. In one embodiment of the invention, an integer store operation is used to store a pointer to memory. Depending on how the GPU pointers are represented in the IL, some adjustment may be needed to get the integer value equal to the CPU virtual address for a GPU pointer in one embodiment of the invention. The sample code 500 illustrates one embodiment of an adjustment written in C language.

Lines 510 illustrate a declaration of a linked list node. Lines 520 illustrate a declaration of a linked list node context. Lines 530 illustrate a foo function to be executed on the GPU. Line 540 illustrates a declaration of a linked list node pointer p. Lines 550 illustrate the main code that places a data-parallel task into a queue and the appropriate adjustment of the linked list node pointer p. One of ordinary skill in the relevant art will readily appreciate the workings of the sample code 500 and it shall not be described herein.

FIG. 6 illustrates a sample code 600 in accordance with one embodiment of the invention. For clarity of illustration, FIG. 6 is discussed with reference to FIGS. 3, 4 and 5. The sample code 600 illustrates a GenX JIT IL code that is generated by a compiler in one embodiment of the invention. Line 616 illustrates a parameter i0.x that has the index i that is obtained from the thread index from the sample code 500. The parameter i0.x is changed into a byte offset and is added to the pointer ptr2 336 to obtain the pointer ptr3 in line 616.

The pointer ptr3 allows the GPU to store data in one embodiment of the invention. For example, in line 630, the GPU uses the pointer ptr3 to store the value of &p[i+1]. One of ordinary skill in the relevant art will readily appreciate the workings of the sample code 500 and it shall not be described herein. The sample codes illustrated in FIGS. 400, 500, and 600 demonstrate embodiments of the invention used in a compiler backend but it is not meant to be limiting. In another embodiment of the invention, a compiler frontend such as, but not limited to, Clang that uses C, C++, Objective C, Objective C++, and OpenCL source to generate LLVMIR.

For example, FIG. 7 illustrates a sample code 700 written in standard OpenCL that is equivalent to the linked list in the sample code 500 in accordance with one embodiment of the invention. The sample code 700 illustrates a source to source transformation that can be used to implement the shared pointers on top of a standard Open CL stack in one embodiment of the invention. One of ordinary skill in the relevant art will readily appreciate the workings of the sample code 700 and shall not be described herein.

In one embodiment of the invention, the heterogeneous platform has processing cores that use different width or size of the address space. For example, in one embodiment of the invention, the CPU has a 64 bit address space and the GPU has a 32 bit address space. By maintaining the in-memory representation of pointers in the GPU in the same way as the CPU represents pointers, the 64-bit applications on the CPU can share virtual memory with a GPU that supports only 32-bit pointers.

Figure 8:
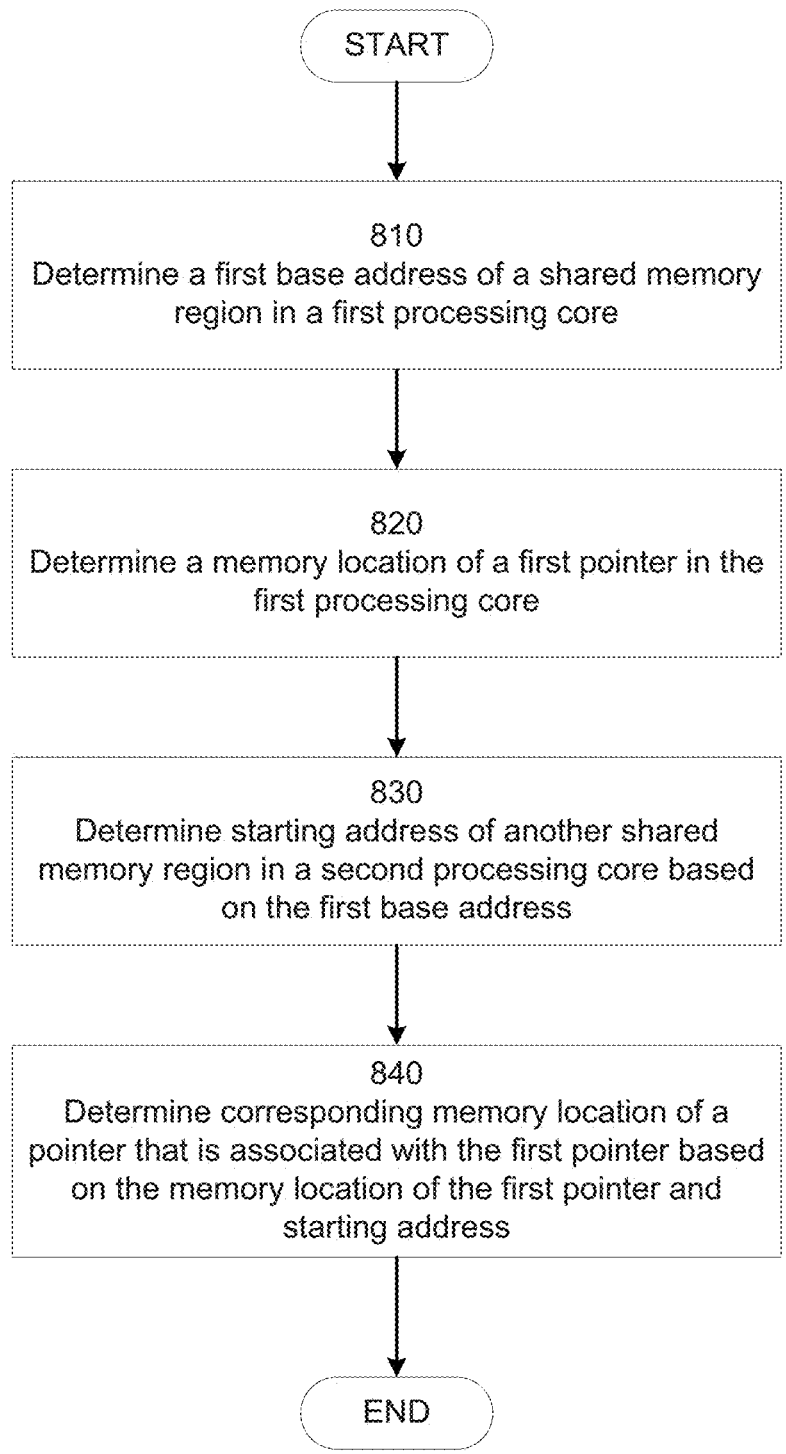
FIG. 8 illustrates a flowchart in accordance with one embodiment of the invention.

FIG. 8 illustrates a flowchart 800 in accordance with one embodiment of the invention. For clarity of illustration, FIG. 8 is discussed with reference to FIG. 3. In step 810, the flow 800 determines a first base address of a shared memory region in a first processing core. For example, in one embodiment of the invention, step 810 determines the base address 314 of the shared region 310 in the virtual address space 302 of the CPU.

In step 820, the flow 800 determines a memory location of a first pointer in the first processing core. For example, in one embodiment of the invention, step 820 determines the memory location of the pointer p 316 in the virtual address space 302 of the CPU. In one embodiment of the invention, the first base address determined in step 810 and the memory location determined in step 820 are stored as runtime integer constants. The first base address determined in step 810 and the memory location determined in step 820 are made available to a second processing core so that it can map or translate its pointer that corresponds to the first pointer in the first processing core.

In step 830, the flow 800 determines a starting address of another shared memory region in a second processing core based on the first base address. For example, in one embodiment of the invention, step 830 determines the memory location of the pointer ptr1 332 in the memory region u0 330 of the GPU using the first base address. The pointer ptr0 334 is known to the second processing core and the pointer ptr1 332 is determined by subtracting the first base address from the pointer ptr0 334. In another embodiment of the invention, the pointer ptr1 332 is determined by adding the pointer ptr0 334 and a negative value of the first base address.

In step 840, the flow 800 determines the corresponding memory location of a pointer that is associated with the first pointer based on the memory location of the first pointer and starting address and the flow 800 ends. For example, in one embodiment of the invention, step 840 determines the memory location of the pointer ptr2 336 in the memory region u0 330 of the GPU using the memory location of the first pointer, i.e., c0.y 322 and the starting address, i.e., pointer ptr1 332. The pointer ptr2 336 is determined by adding the pointer ptr1 332 and the parameter c0.y 322. In another embodiment of the invention, standard compiler optimizations such as, but not limited to, code motion can be applied to hoist pointer operations out of loops when possible.

In another embodiment of the invention, a compiler optimization may choose to store pointers in the GPU format instead of the CPU format as described earlier. When the pointers are stored in the GPU format, no conversion is required for any load or store operations in one embodiment of the invention. In one embodiment of the invention, a GPU pointer is converted to a CPU pointer by performing an inverse pointer operation(s). For example, in FIG. 3, the pointer ptr2 336 can be converted to the pointer p 316 by performing an inverse pointer operation(s). One of ordinary skill in the relevant art will readily appreciate how to perform the inverse pointer operation(s) and it shall not be described herein.

Figure 9:
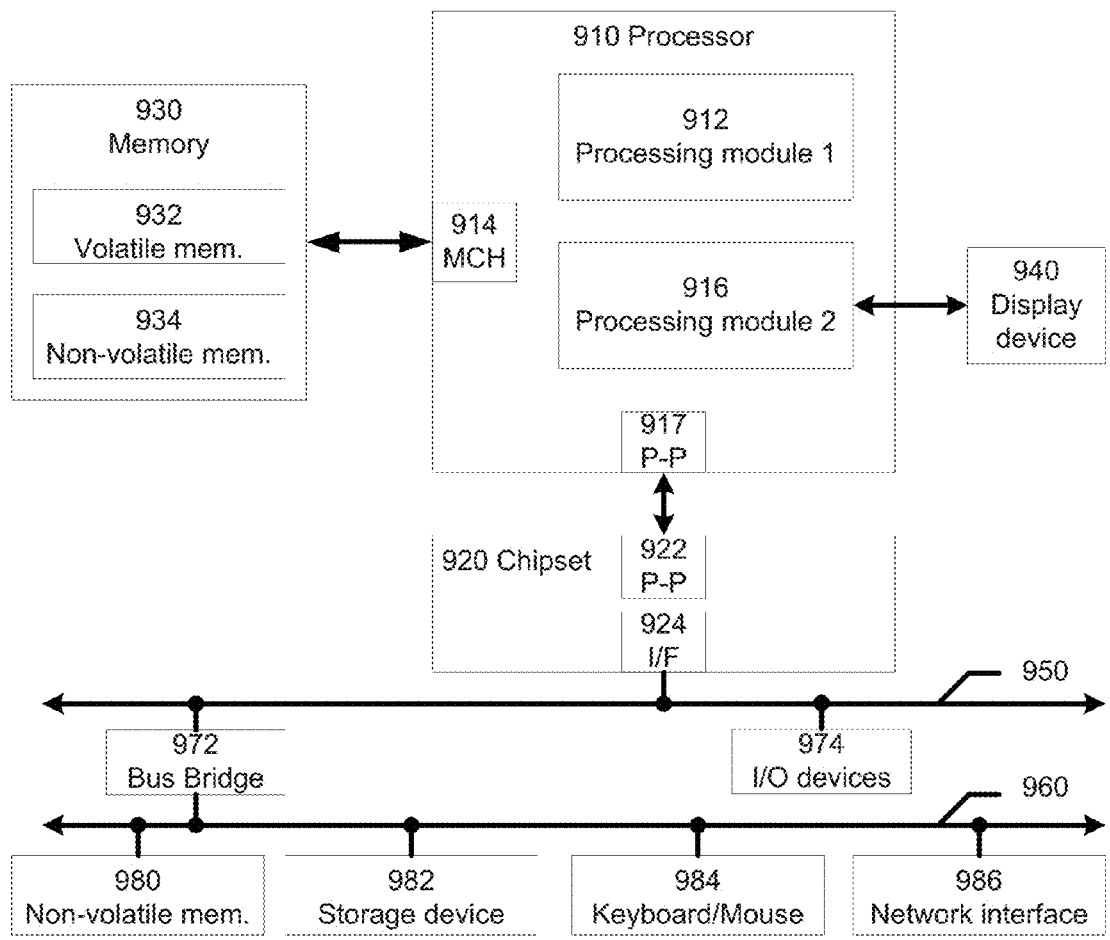
FIG. 9 illustrates a system to implement the methods disclosed herein in accordance with one embodiment of the invention.

FIG. 9 illustrates a system 900 to implement the methods disclosed herein in accordance with one embodiment of the invention. The system 900 includes, but is not limited to, a desktop computer, a laptop computer, a net book, a notebook computer, a personal digital assistant (PDA), a server, a workstation, a cellular telephone, a mobile computing device, an Internet appliance or any other type of computing device. In another embodiment, the system 900 used to implement the methods disclosed herein may be a system on a chip (SOC) system.

The processor 910 has a processing module 1 912 to execute instructions of the system 900. The processing module 1 910 includes, but is not limited to, pre-fetch logic to fetch instructions, decode logic to decode the instructions, execution logic to execute instructions and the like. The processor processing module 1 910 has a cache memory (not shown) to cache instructions and/or data of the system 900. In another embodiment of the invention, the cache memory includes, but is not limited to, level one, level two and level three, cache memory or any other configuration of the cache memory within the processing module 1 910.

The processor 910 has a processing module 2 916 that is coupled a display device 940. The display device 940 includes, but is not limited to, liquid crystal display (LCD), cathode ray tube (CRT) display, or any other form of visual display device. The processing module 2 916 performs graphics processing operations in one embodiment of the invention. The processing module 2 916 may also execute instructions or handle tasks offloaded to it by the processing module 1 912.

The memory control hub (MCH) 914 performs functions that enable the processor 910 to access and communicate with a memory 930 that includes a volatile memory 932 and/or a non-volatile memory 934. The volatile memory 932 includes, but is not limited to, Synchronous Dynamic Random Access Memory (SDRAM), Dynamic Random Access Memory (DRAM), RAMBUS Dynamic Random Access Memory (RDRAM), and/or any other type of random access memory device. The non-volatile memory 934 includes, but is not limited to, NAND flash memory, phase change memory (PCM), read only memory (ROM), electrically erasable programmable read only memory (EEPROM), or any other type of non-volatile memory device.

The memory 930 stores information and instructions to be executed by the processor 910. The memory 930 may also stores temporary variables or other intermediate information while the processor 910 is executing instructions. The chipset 920 connects with the processor 910 via Point-to-Point (PtP) interfaces 917 and 922. The chipset 920 enables the processor 910 to connect to other modules in the system 900. In one embodiment of the invention, the interfaces 917 and 922 operate in accordance with a PtP communication protocol such as the Intel® QuickPath Interconnect (QPI) or the like.

In addition, the chipset 920 connects to one or more buses 950 and 960 that interconnect the various modules 974, 980, 982, 984, and 986. Buses 950 and 960 may be interconnected together via a bus bridge 972 if there is a mismatch in bus speed or communication protocol. The chipset 920 couples with, but is not limited to, a non-volatile memory 980, a mass storage device(s) 982, a keyboard/mouse 984 and a network interface 986. The mass storage device 982 includes, but is not limited to, a solid state drive, a hard disk drive, an universal serial bus flash memory drive, or any other form of computer data storage medium. The network interface 986 is implemented using any type of well-known network interface standard including, but not limited to, an Ethernet interface, a universal serial bus (USB) interface, a Peripheral Component Interconnect (PCI) Express interface, a wireless interface and/or any other suitable type of interface. The wireless interface operates in accordance with, but is not limited to, the IEEE 802.11 standard and its related family, Home Plug AV (HPAV), Ultra Wide Band (UWB), Bluetooth, WiMax, or any form of wireless communication protocol.

While the modules shown in FIG. 9 are depicted as separate blocks within the system 900, the functions performed by some of these blocks may be integrated within a single semiconductor circuit or may be implemented using two or more separate integrated circuits. The methods disclosed herein can be implemented in hardware, software, firmware, or any other combination thereof. Although examples of the embodiments of the disclosed subject matter are described, one of ordinary skill in the relevant art will readily appreciate that many other methods of implementing the disclosed subject matter may alternatively be used. In the preceding description, various aspects of the disclosed subject matter have been described. For purposes of explanation, specific numbers, systems and configurations were set forth in order to provide a thorough understanding of the subject matter. However, it is apparent to one skilled in the relevant art having the benefit of this disclosure that the subject matter may be practiced without the specific details. In other instances, well-known features, components, or modules were omitted, simplified, combined, or split in order not to obscure the disclosed subject matter.

The term "is operable" used herein means that the device, system, protocol, etc., is able to operate or is adapted to operate for its desired functionality when the device or system is in off-powered state. Various embodiments of the disclosed subject matter may be implemented in hardware, firmware, software, or combination thereof, and may be described by reference to or in conjunction with program code, such as instructions, functions, procedures, data structures, logic, application programs, design representations or formats for simulation, emulation, and fabrication of a design, which when accessed by a machine results in the machine performing tasks, defining abstract data types or low-level hardware contexts, or producing a result.

The techniques shown in the figures can be implemented using code and data stored and executed on one or more computing devices such as general purpose computers or computing devices. Such computing devices store and communicate (internally and with other computing devices over a network) code and data using machine-readable media, such as machine readable storage media (e.g., magnetic disks; optical disks; random access memory; read only memory; flash memory devices; phase-change memory) and machine readable communication media (e.g., electrical, optical, acoustical or other form of propagated signals—such as carrier waves, infrared signals, digital signals, etc.).

While the disclosed subject matter has been described with reference to illustrative embodiments, this description is not intended to be construed in a limiting sense. Various modifications of the illustrative embodiments, as well as other embodiments of the subject matter, which are apparent to persons skilled in the art to which the disclosed subject matter pertains are deemed to lie within the scope of the disclosed subject matter.

What is claimed is:

1. One or more non-transitory computer readable media having instructions thereon that, in response to execution by a second processing device of a computer device having a first and the second processing device, cause the second processing device of the computer device to:
   receive, from the first processing device, a first pointer to a memory location of the computer device, wherein the memory location resides in a region of a memory that is accessible by both the first processing device and the second processing device, wherein the first pointer is not in a format usable by the second processing device to access the memory location;
   generate a second pointer, by the second processing device, based on the first pointer, that is in the format usable by the second processing device to access the memory location; and
   access the memory location, by the second processing device, using the second pointer.

2. The one or more non-transitory computer readable media of claim 1, wherein the first pointer has a different length than the second pointer.

3. The one or more non-transitory computer readable media of claim 1, wherein the first pointer encodes the memory location in accordance with a first technique and the second pointer encodes the memory location in accordance with a second technique different from the first technique.

4. The one or more non-transitory computer readable media of claim 3, wherein the first technique or the second technique encodes the memory location based on a binding table index and an offset.

5. The one or more non-transitory computer readable media of claim 3, wherein the first technique or the second technique encodes the memory location based on a base address of the shared memory region and a memory address of a pointer in the shared memory region.

6. The one or more non-transitory computer readable media of claim 1, wherein the first pointer is received as an argument of a function.

7. The one or more non-transitory computer readable media of claim 1, wherein the computer device includes a compiler having logic to generate the second pointer.

8. A method for accessing memory shared by a first and a second processing device on a computing device, comprising:
   receiving, by the second processing device, from the first processing device, a first pointer to a memory location of the computing device, wherein the memory location resides in a region of a memory that is accessible by both the first processing device and the second processing device, wherein the first pointer is not in a format usable by the second processing device to access the memory location;
   generating a second pointer, by the second processing device, based on the first pointer, that is in the format usable by the second processing device to access the memory location; and
   accessing, by the second processing device, the memory location, using the second pointer.

9. The method of claim 8, wherein the first pointer has a different length than the second pointer.

10. The method of claim 8, wherein the first pointer encodes the memory location in accordance with a first technique and the second pointer encodes the memory location in accordance with a second technique different from the first technique.

11. The method of claim 10, wherein the first technique or the second technique encodes the memory location based on a binding table index and an offset.

12. The method of claim 11, wherein the first technique or the second technique encodes the memory location based on a base address of the shared memory region and a memory address of a pointer in the shared memory region.

13. The method of claim 8, wherein the first pointer is received as an argument of a function.

14. A computer device, comprising:
   a first and a second processing device; and a memory;

wherein the second processing device is to:

receive, from the first processing device, a first pointer to a location of the memory, wherein the memory location resides in a region of the memory that is accessible by both the first processing device and the second processing device, wherein the first pointer is not in a format usable by the second processing device to access the memory location;

generate a second pointer, based on the first pointer, that is in the format usable by the second processing device to access the memory location; and access the memory location using the second pointer.

15. The computer device of claim 14, wherein the first pointer has a different length than the second pointer.

16. The computer device of claim 14, wherein the first pointer encodes the memory location in accordance with a first technique and the second pointer encodes the memory location in accordance with a second technique different from the first technique.

17. The computer device of claim 14, wherein the first pointer is received as an argument of a function.

\* \* \* \* \*